(12) United States Patent
Gareau et al.

(10) Patent No.: US 10,396,972 B1
(45) Date of Patent: Aug. 27, 2019

(54) PRECISE TIME SYNCHRONIZATION ACROSS OPTICAL MODULES FOR GROUP ALIGNMENT

(71) Applicant: Ciena Corporation, Hanover, MD (US)

(72) Inventors: Sebastien Gareau, Ottawa (CA); Daniel Claude Perras, Ottawa (CA); Michael Watford, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/902,008

(22) Filed: Feb. 22, 2018

(51) Int. Cl.
*H04J 14/08* (2006.01)
*H04L 7/00* (2006.01)

(52) U.S. Cl.
CPC .................................. *H04L 7/0075* (2013.01)

(58) Field of Classification Search
CPC ....... H04L 7/0075; H04B 10/27; H04B 10/60; H04J 14/08
See application file for complete search history.

(56) References Cited

U.S. PATENT DOCUMENTS

| | | | |
|---|---|---|---|
| 8,718,482 B1 | 5/2014 | Roberts et al. | |
| 9,276,689 B2 | 3/2016 | Geva et al. | |
| 9,432,144 B2 | 8/2016 | Gareau et al. | |
| 2012/0275501 A1 | 11/2012 | Rotenstein | |
| 2014/0169792 A1* | 6/2014 | Lee | H04J 3/0673 398/66 |
| 2014/0355986 A1 | 12/2014 | Trojer et al. | |
| 2015/0207714 A1 | 7/2015 | Ruffini et al. | |
| 2015/0304066 A1* | 10/2015 | Dutti | H04L 43/0864 398/98 |
| 2016/0080110 A1* | 3/2016 | Gareau | H04B 10/27 398/66 |
| 2016/0380698 A1 | 12/2016 | Elahmadi et al. | |
| 2017/0005949 A1 | 1/2017 | Gareau | |
| 2017/0093757 A1 | 3/2017 | Gareau et al. | |
| 2017/0126589 A1 | 5/2017 | Estabrooks et al. | |
| 2018/0006931 A1* | 1/2018 | Ellis | H04L 1/0018 |
| 2018/0013509 A1* | 1/2018 | Meyer | H04J 3/07 |

FOREIGN PATENT DOCUMENTS

WO 2017/012486 A1 1/2017

OTHER PUBLICATIONS

Geoffrey M. Garner, IEEE 1588 Version 2, ISPCS, Ann Arbor'08, Sep. 24, 2008, pp. 1-89.

(Continued)

*Primary Examiner* — Dzung D Tran
(74) *Attorney, Agent, or Firm* — Clements Bernard Walker PLLC; Christopher L. Bernard; Lawrence A. Baratta, Jr.

(57) ABSTRACT

An optical system supporting timing synchronization, alignment and deskewing across optical modules includes a plurality of optical devices each providing an Optical Tributary Signal (OTSi) which are part of an Optical Tributary Signal Group (OTSiG); and a management communication mechanism between the plurality of optical devices, wherein each of the plurality of optical devices are timing synchronized using the management communication mechanism and Precision Time Protocol (PTP) messaging. Each of the plurality of optical devices can include delay circuitry configured to deskew an associated OTSi with respect to other OTSi signals in the OTSiG.

20 Claims, 8 Drawing Sheets

(56) References Cited

OTHER PUBLICATIONS

OIF Optical Internetworking Forum, IA OIF-FLEXE-01.1, Flex Ethernet Implementation Agreement 1.1, Jun. 21, 2017, pp. 1-35.
Vissers et al., ITU International Telecommunication Union, Telecommunication Standardization Sector, Flexible OTN long-reach interface, SG15-TD95 Rev.1/WP3, Study Group 15, Study Period 2017-2020, Geneva, Jun. 19-30, 2017, Editors G.709.flexo-lr, Draft 02 of G.709.flexo-lr, pp. 1-20.
International Telecommunication Union, ITU-T G.709.1/Y.1331.1, Telecommunication Standardization Sector of ITU, Jan. 2017, Flexible OTN short-reach interface, pp. 1-30.
International Telecommunication Union, ITU-T G.709/Y.1331, Telecommunication Standardization Sector of ITU, Jun. 2016, Interfaces for the optical transport network, pp. 1-34.
International Telecommunication Union, ITU-T G.959.1, Telecommunication Standardization Sector of ITU, Apr. 2016, Optical transport network physical layer interfaces, pp. 1-76.
International Telecommunication Union, ITU-T G.8265.1/Y.1365.1, Telecommunication Standardization Sector of ITU, Jul. 2014, Precision time protocol telecom profile for frequency synchronization, pp. 1-32.
International Telecommunication Union, ITU-T G.8275.1/Y.1369.1, Telecommunication Standardization Sector of ITU, Jun. 2016, Precision time protocol telecom profile for phase/time synchronization with full timing support from the network, pp. 1-56.
Apr. 5, 2019 International Search Report issued in International Application No. PCT/US2019/014147.

* cited by examiner

PRECISE TIME SYNCHRONIZATION ACROSS OPTICAL MODULES FOR GROUP ALIGNMENT

FIELD OF THE DISCLOSURE

The present disclosure generally relates to optical networking systems and methods. More particularly, the present disclosure relates to systems and methods for precise time synchronization across optical modules for Flexible Optical (FlexO) or Flexible Ethernet (FlexE) group alignment.

BACKGROUND OF THE DISCLOSURE

In high bandwidth optical transport networks, recent standards such as ITU-T Recommendation G.709 "Interfaces for the optical transport network" (June 2016), the contents of which are incorporated by reference, describe the use of multiple optical carriers for a single digital transport interface in line side applications, such as an Optical Transport Unit-Cn (OTUCn) which is carried via multiple Optical Tributary Signal (OTSi) carriers (lambdas). OTSi is described in G.959.1 "Optical transport network physical layer interfaces" (April 2016), the contents of which are incorporated by reference, as an optical signal that is placed within a Network Media Channel (NMC) for transport across the optical network. This may include a single modulated optical carrier or a group of modulated optical carriers or subcarriers. For client-side applications, ITU-T Recommendation G.709.1 "Flexible OTN short-reach interface" (January 2017) the contents of which are incorporated by reference and future ITU-T Recommendation G.709.3 "FlexO for longer reach interfaces,", define the use of multiple client services/modules for a single OTUCn transport service. Similarly, the Optical Internetworking Forum (OIF) has worked on IA # OIF-FLEXE-01.1 "Flex Ethernet Implementation Agreement" (June 2017), the contents of which are incorporated by reference, for FlexE to transport an Ethernet client service across multiple standard rate client interfaces/servers.

Timing synchronization between nodes in a network is described in various standards such as IEEE 1588-2008 "Standard for a Precision Clock Synchronization Protocol for Networked Measurement and Control Systems," ITU-T G.8265.1/Y.1365.1 (July 2014) "Precision time protocol telecom profile for frequency synchronization," ITU-T G.8275.1 "Time and Phase Profile," the contents of each is incorporated by reference herein. The requisite information for the transfer of precise time is (1) a time reference point, or "significant instant" to which timing information can be related, (2) the timing information itself, and (3) a measure of the delay it takes to transfer the timing information between two nodes. IEEE 1588-2008 is referred to as Precision Time Protocol (PTP) and is used to synchronize time (frequency and phase) throughout the network. IEEE 1588-2008 only defines a protocol for transferring time information over a packet network. In general, PTP supports accuracy in the sub-microsecond range.

For example, 2×OTSi in an OTSiG (OTSi Group) has two physically independent optical carriers which are transported in the network, but which are logically part of the same group. There is a need to deskew OTSi due to differences in light propagation speed, chromatic dispersion, etc. For creating 2×OTSi into an OTSiG (OTSi Group), most solutions (e.g., Digital Signal Processing (DSP) Application Specific Integrated Circuit (ASIC)) are built in an integrated manner, e.g., in a single die or package. As such, sharing a common time base for deskewing and alignment purposes is less complex were all members of the group are collocated on the same physical device. Since their OTSi members are physically separate signals but treated logically as a group, there is a requirement to deskew these signals to ensure all signals have the same time base.

BRIEF SUMMARY OF THE DISCLOSURE

With OTSi signals originating from separate hardware (e.g., via different optical modules, etc.), there is a requirement to communicate timing for deskewing. Standardized interfaces such as on-board optics via the Consortium for On-Board Optics (COBO) and pluggable modules such as CFP2-DCO, QSFP-DD, etc. have standardized connectors, and these do not support proprietary deskew pins. Accordingly, there is a need for a novel approach for coordinating time base between different optics devices for the purpose of deskewing, aligning, etc.

In an embodiment, an optical system supporting timing synchronization and alignment or deskewing across optical modules includes a plurality of optical devices each providing an Optical Tributary Signal (OTSi) which is part of an Optical Tributary Signal Group (OTSiG); and a management communication mechanism between the plurality of optical devices, wherein each of the plurality of optical devices are timing synchronized using the management communication mechanism and Precision Time Protocol (PTP) messaging. Each of the plurality of optical devices can include delay circuitry configured to deskew an associated OTSi with respect to other OTSi signals in the OTSiG. Each of the plurality of optical devices can include a time base which is synchronized between each of the plurality of optical devices. Each of the plurality of optical devices can be configured to measure relative skew of its OTSi using the time base. The relative skew can be measured for one of a Flexible Ethernet (FlexE) signal based on a shim multiframe and a Flexible Optical (FlexO) signal based on an Optical Transport Unit C (OTUC) Multiframe Alignment Signal (MFAS). The management communication mechanism can include Ethernet.

The management communication mechanism can include one of a standards-based interface based on a Multi Source Agreement (MSA) or Optical Internetworking Forum (OIF) Digital Coherent Optics (DCO), a backplane interface, and an external interface connected via cables. The plurality of optical devices can include pluggable optical modules compliant to one of a Multi Source Agreement (MSA) and Optical Internetworking Forum (OIF) Digital Coherent Optics (DCO). The plurality of optical devices can include standardized on-board optics. The plurality of optical devices can include independent hardware modules. Each of the plurality of optical devices can include a host board and an optical modem. The host board can include an Ethernet switch which is part of the management communication mechanism and connected to other Ethernet switches on other host boards. The host board can include an IEEE 1588 clock which is configured to perform the Precision Time Protocol (PTP) messaging for synchronization. The optical modem can include an IEEE 1588 clock which is configured to perform the Precision Time Protocol (PTP) messaging for synchronization. The optical modem can include delay measurement and control circuitry which is configured to measure delay and to deskew signals.

In another embodiment, an optical modem supporting an Optical Tributary Signal (OTSi) which is part of an Optical Tributary Signal Group (OTSiG) includes a coherent modem; circuitry configured to perform a plurality of Forward Error Correction (FEC), framing, and mapping; a time base which is synchronized with other optical modems in the OTSiG using a management communication mechanism and Precision Time Protocol (PTP) messaging; and delay measurement and control circuitry configured to measure delay, determine a relative skew, and deskew based on a common time base. The optical modem can be a pluggable optical module compliant to one of a Multi Source Agreement (MSA) and Optical Internetworking Forum (OIF) Digital Coherent Optics (DCO). The optical modem can be a standardized on-board optics module. The optical modem can be disposed in an independent hardware module.

In a further embodiment, a method for timing synchronization and deskewing across optical modules includes providing a plurality of an Optical Tributary Signal (OTSi) members each from one of a plurality of optical devices; managing the OTSi members as an Optical Tributary Signal Group (OTSiG); communicating Precision Time Protocol (PTP) messages between the plurality of optical devices for timing synchronization; and deskewing the OTSi members based on relative skew and the timing synchronization.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for precise time synchronization across optical modules for Flexible Optical (FlexO) or Flexible Ethernet (FlexE) group alignment. The systems and methods utilize IEEE 1588 PTP to synchronize time across coherent optical modems to enable FlexO or FlexE alignment. In the source (generating) functions, this FlexE/O alignment is the process of creating members (OTC or FlexE) with the same frequency and same (multi-)frame locations. In the sink (terminating) functions, this FlexO/E alignment is the process of deskewing members (OTUC or FlexE shim) that are transported across various OTSi (carriers, lambdas) in an OTSiG (group, media channel). The various OTSi are subject to chromatic dispersion and can experience skew differences up to ~7 μs when propagated across a long-haul optical path. The FlexE/FlexO alignment is also needed to drive standard consequent actions, for example, an Optical Data Unit Cn (ODUCn, where C=100 and n=1, 2, 3, . . . ) Alarm Indication Signal (AIS). The systems and methods make use of standard defined optical module electrical interfaces or existing line card backplane interfaces or product/shelf Internal Local Area Network (ILAN) interface in a novel way to enable grouping for FlexE and FlexO across multiple optical modems. These optical modems can be located on a single card, can be distributed on multiple line cards/slots (in a shelf), or can even be distributed across multiple shelves (i.e., pizza box stacking).

Figure 1:
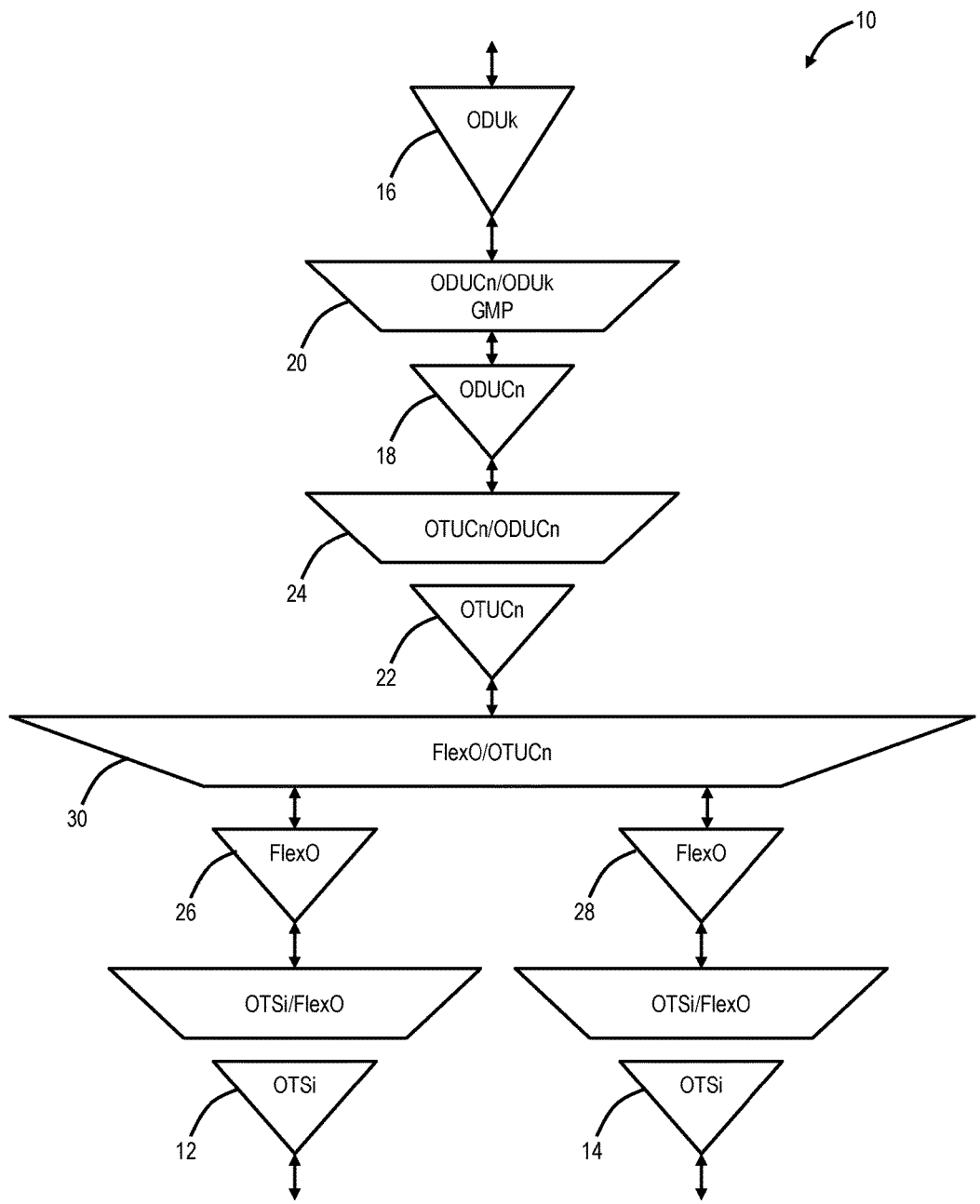
FIG. 1 is a logical diagram of an Optical Transport Unit Cn (OTUCn, C=100, n=1, 2, 3, . . . ) transport signal carried across 2 Optical Tributary Signal (OTSi) carriers.

FIG. 1 is a logical diagram of an Optical Transport Unit Cn (OTUCn, C=100, n=1, 2, 3, . . . ) transport signal 10 carried across 2 Optical Tributary Signal (OTSi) 12, 14 carriers. In this example, the OTUCn transport signal 10 is an OTUC4, i.e., 400 G carried across 2×200 G OTSi. Starting at the top of FIG. 1, an Optical Data Unit k (ODUk) 16 is mapped to an Optical Data Unit Cn (ODUCn) 18 via Generic Mapping Procedure (GMP) ODUCn/ODUk 20. The ODUCn 18 is mapped to an OTUCn 22 via OTUCn/ODUCn adaptation 24. The OTUCn 22 are mapped to a sink FlexO function 26, 28 via FlexO/OTUCn mapping 30. The sink FlexO function 26, 28 must align and perform deskewing (based on G.798 logical lane alignment) to reconstitute the OTUCn (i.e., OTUC4 400 G) transport signal. The deskewing can be performed based on G.798 "Characteristics of optical transport network hierarchy equipment functional blocks" (December 2012), the contents of which are incorporated by reference, and the logical lane alignment. In order to do this, it must use OTUC multiframe boundaries and a common reference time based across the members in the group. In server signal failures, the source FlexO function needs to drive an ODUCn-AIS with ODUC slices aligned.

Figure 2:
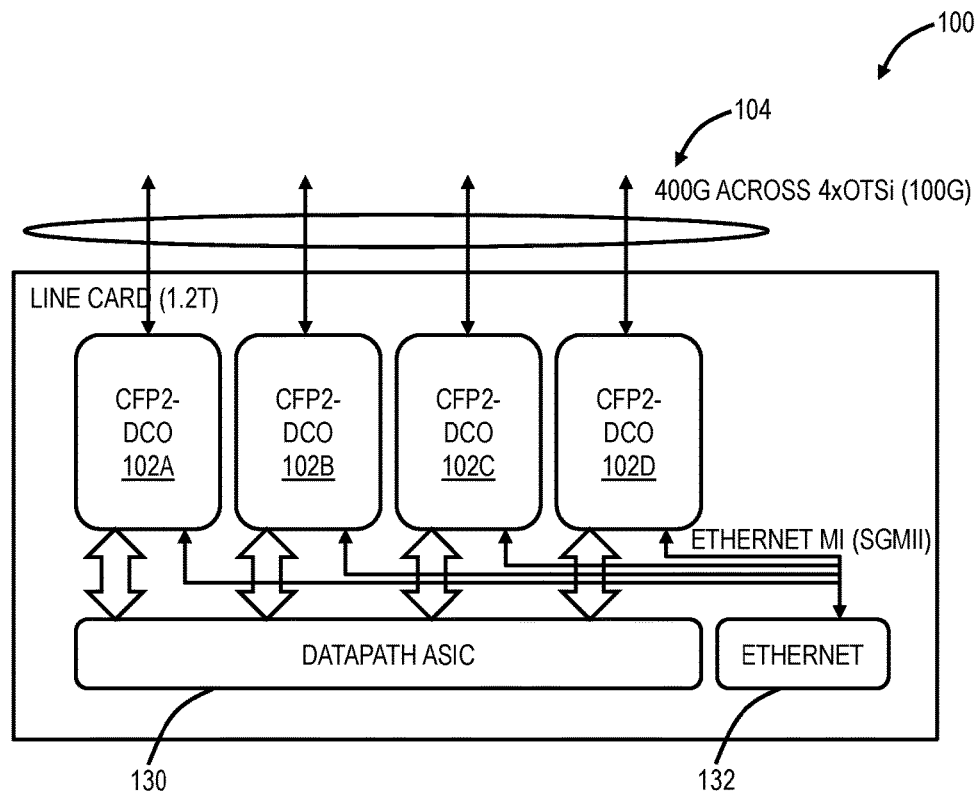
FIG. 2 is a block diagram of a line card supporting multiple pluggable optical modules forming a single OTSi Group (OTSiG)
Figure 3:
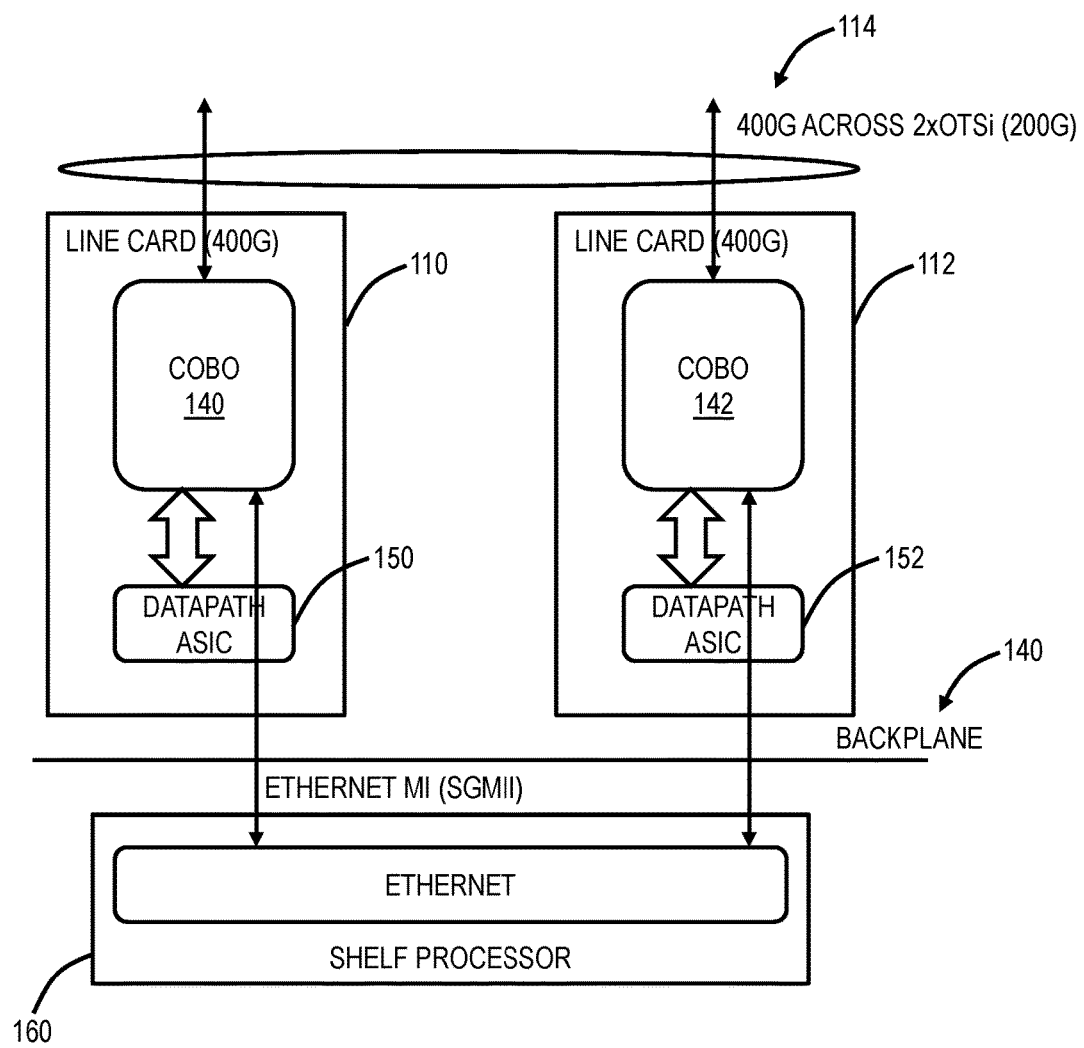
FIG. 3 is a block diagram of multiple line cards collectively supporting a single OTSiG.
Figure 4:
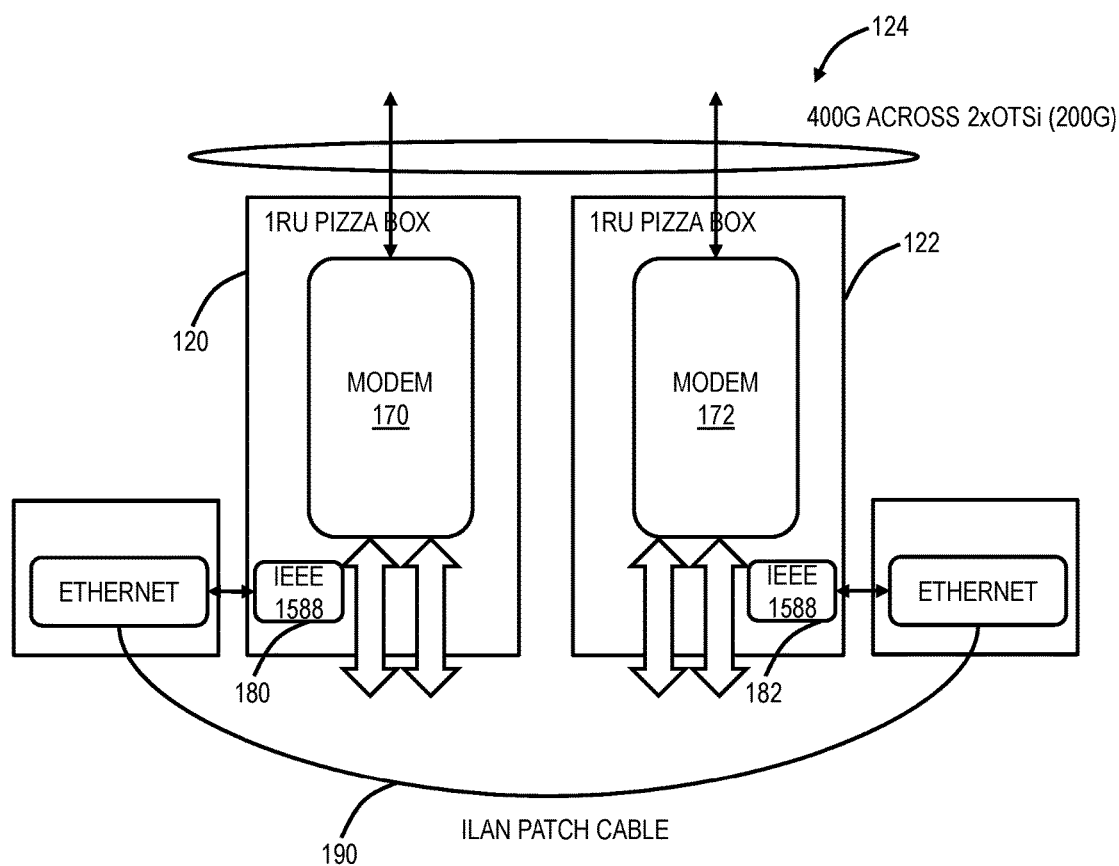
FIG. 4 is a block diagram of multiple hardware modules (e.g., "pizza boxes") collectively supporting a single OTSiG.

FIG. 2 is a block diagram of a line card 100 supporting multiple pluggable optical modules 102A-102D forming a single OTSiG 104. FIG. 3 is a block diagram of multiple line cards 110, 112 collectively supporting a single OTSiG 114. FIG. 4 is a block diagram of multiple hardware modules 120, 122 (e.g., "pizza boxes") collectively supporting a single OTSiG 124. Each of these examples illustrates multiple hardware devices forming a single OTSiG 104, 114, 124. Those skilled in the art will recognize other embodiments are also contemplated.

In FIG. 2, there are four example pluggable optical modules 102A-102D which are CFP2-DCO (Digital Coherent Optics). CFP2-DCO is standardized by the OIF. For example, the CFP2-DCO can each support 100G to 200G to 400G. Assume each of the pluggable optical modules 102A-102D supports 100G, so the line card 100 support 400G across 4×OTSi (100G). The pluggable optical modules 102A-102D each are connected to data path circuitry 130 (data path ASIC). Further, each of the pluggable optical modules 102A-102D supports an Ethernet MI (SGMII) interface 132 which is a Serial Gigabit Media-Independent Interface (SGMII).

In FIG. 3, there are two separate line card 110, 112 which can be housed in a backplane 140 in a shelf/chassis. The line cards 110, 112 each include a COBO module 140, 142. The COBO modules 140, 142 are standardized through the Consortium for On-Board Optics (COBO) (onboardoptics.org/) and these modules are standardized for mounting on Printed Circuit Boards (PCBs) and the like. For example, each of the COBO modules 140, 142 can support 200G to 400G. Assume each of the COBO modules 140, 142 supports 200G so that the two line cards 110, 112 can support 400G across 2×OTSi (200G). Each of the COBO modules 140, 142 can include data path circuitry 150, 152 and connect to a shelf processor 160 via an Ethernet MI (SGMII) interface over the backplane 140.

In FIG. 4, there are two separate hardware modules 120, 122 which can be referred to as "pizza boxes" which are 1-2 Rack Unit (RU) sized, self-contained chassis. Each hardware module 120, 122 includes an optical modem 170, 172 which can be a proprietary design or standardized design. The optical modems 170, 172 can support 200G to 400G. Assume each optical modem 170, 172 supports 200G for 400 G across 2×OTSi (200G). Each of the hardware modules 120, 122 can include an IEEE 1588 clock 180, 182 which can operate PTP and connect between to one another via an Ethernet connection such as an Internal LAN (ILAN) cable 190 between the hardware modules 120, 122.

In various embodiments, the systems and methods utilize IEEE PTP synchronization messages between the pluggable optical modules 102A-102D, the line cards 110, 112, the hardware modules 120, 122 on a standard Ethernet-based management interface, across optical module boundaries (i.e., CFP2-DCO) or across line cards (slots) or product box boundaries (i.e. ILAN). This can be used to provide the common time base to the separate modems for FlexE or FlexO.

FIGS. 2-4 illustrate non-limiting examples of how modems can be grouped and the Ethernet-based MI can be used between them to set up a common time base.

Figure 5:
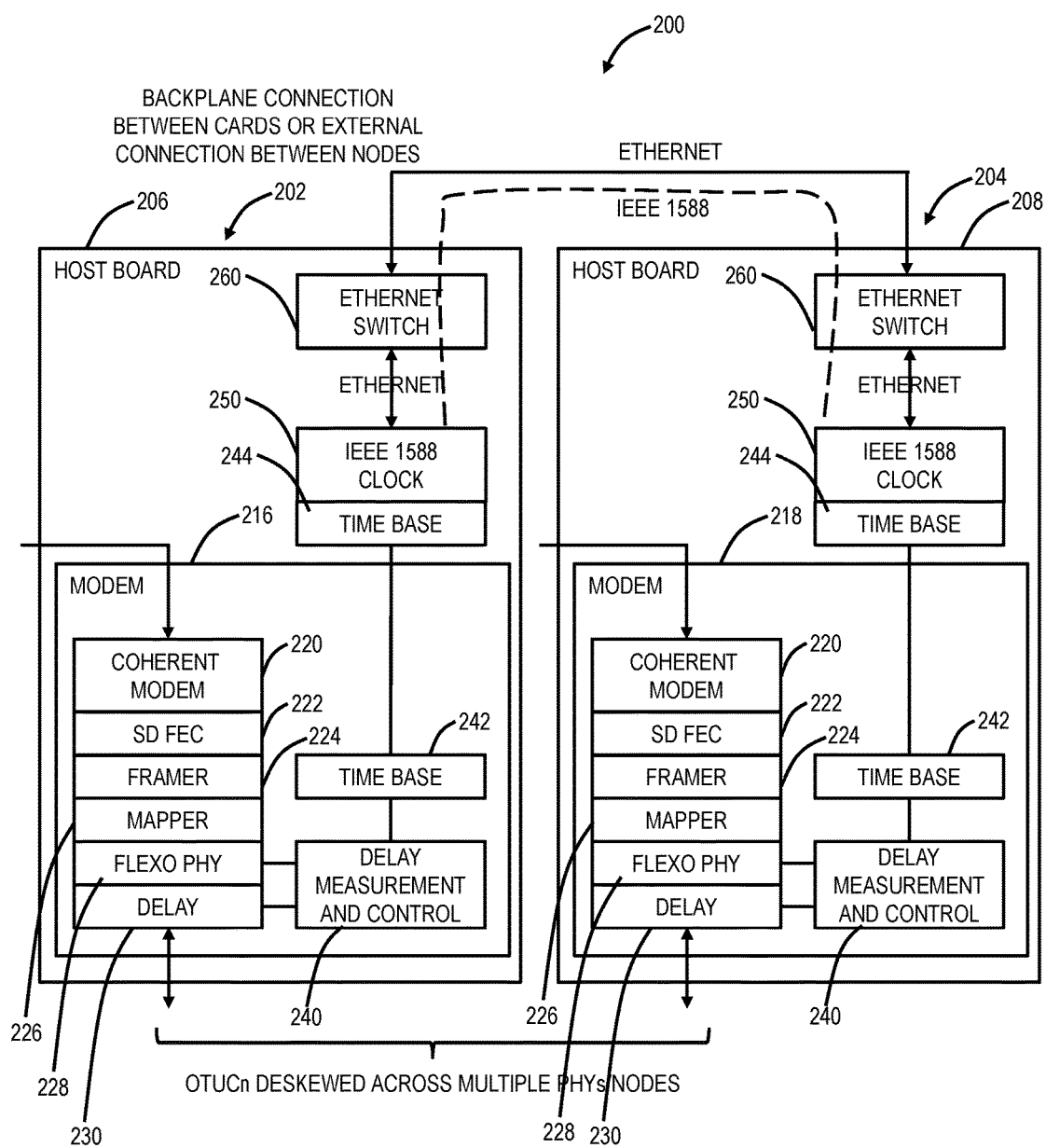
FIG. 5 is a block diagram of a system of two optical devices with IEEE 1588 PTP functionality implemented on host boards.
Figure 6:
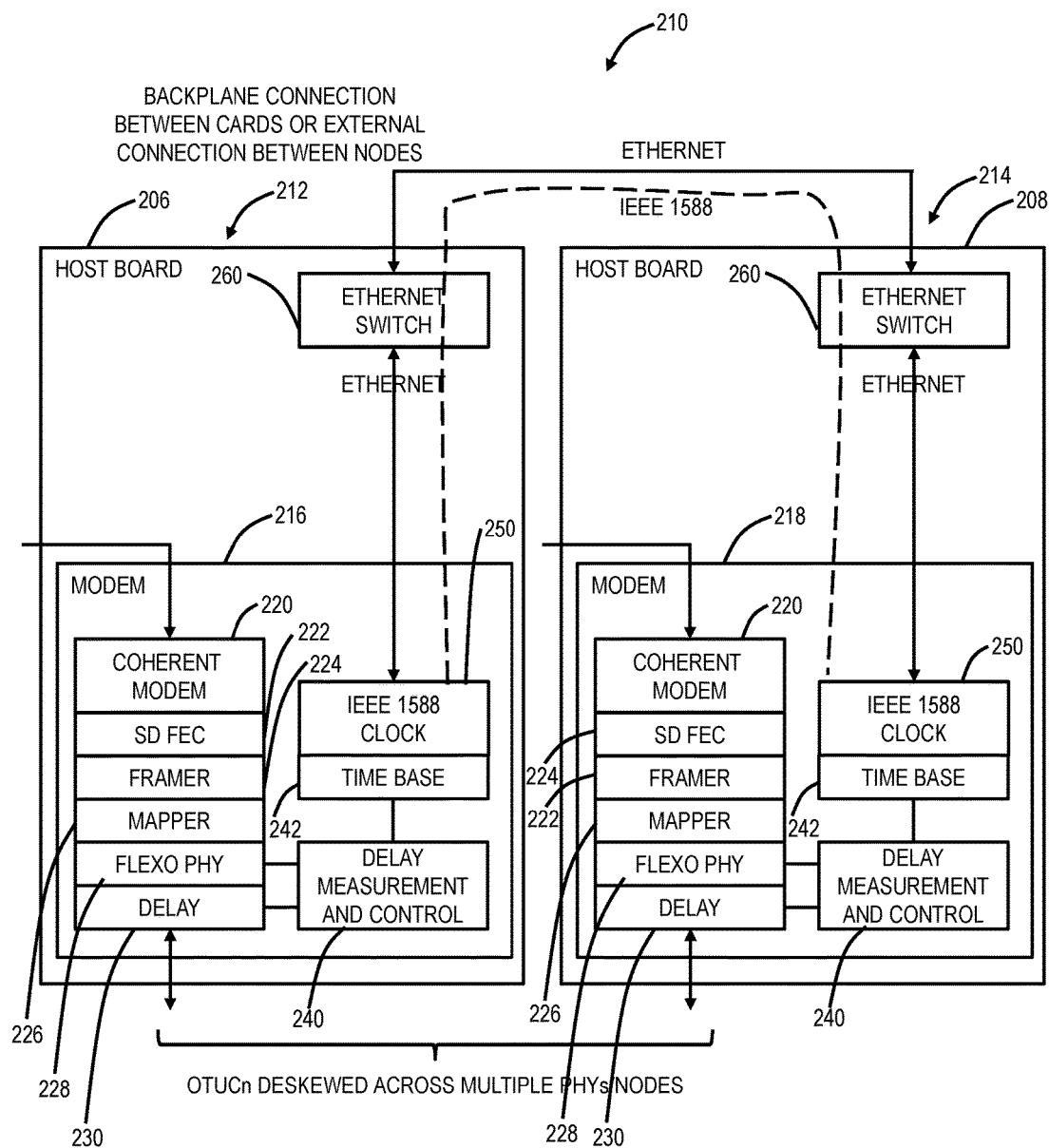
FIG. 6 is a block diagram of a system of two optical devices with IEEE PTP functionality implemented in optical modems.

FIG. 5 is a block diagram of a system 200 of two optical devices 202, 204 with IEEE 1588 PTP functionality implemented on host boards 206, 208. FIG. 6 is a block diagram of a system 210 of two optical devices 212, 214 with IEEE PTP functionality implemented in optical modems 216, 218. Specifically, FIGS. 5 and 6 illustrate the associated functionality of optical devices which are configured in an OTSiG and which include IEEE 1588 PTP for time synchronization and associated functionality for alignment. In FIG. 5, the IEEE 1588 PTP functionality is implemented on the host boards 206, 208 which can be PCBs, etc. and in FIG. 6, the IEEE 1588 PTP functionality is implemented on the optical modems.

The optical modems 216, 218 include a coherent modem 220, Soft Decision (SD) Forward Error Correction (FEC) circuitry 222, a framer 224, a mapper 226, FlexO Physical (PHY) hardware 228, and delay circuitry 230. The optical modems 216, 218 include delay measurement and control circuitry 240 which is configured to determine the delay associated with signals through the coherent modem 220, the circuitry 222, the framer 224, the mapper 226, the hardware 228, and the circuitry 230. The delay measurement and control circuitry 240 also is configured to perform deskewing as described herein. The delay measurement and control circuitry 240 connects to a time base 242 on the optical modules 216, 218. The time base 242 keeps a time value for the optical modules 216, 218 and the objective is to ensure a common time base between the optical devices 202, 204. Also, FIGS. 5 and 6 illustrate two optical devices 202, 204, but those skilled in the art will recognize the systems and methods can operate with a single optical device (and multiple optical modems 216, 218) or with more than two optical devices 202, 204.

The delay measurement and control circuitry 240 provides the delay using the time base 242 which is synchronized with other devices 202, 204 and their time base 242 using IEEE PTP. The delay measurement and control circuitry 240 also uses the time base 242 to deskew signals, e.g., delaying via the delay circuitry 230 such that the signals are at the rate of the latest signal in the OTSiG (or any other approach to deskewing).

In FIG. 5, the time base 242 connects to a time base 244 on the host boards 206, 208 and the time base 244 connects to an IEEE 1588 clock 250 which is configured to implement the PTP functionality. The IEEE 1588 clock 250 connects via Ethernet to an Ethernet switch 260 on the host boards 206, 208 and the Ethernet switches 260 are connected to one another, such as via a cable, via backplane interfaces, etc. In FIG. 6, the time base 242 connects to the IEEE 1588 clock 250 which is in the optical modem 216, 218. The IEEE 1588 clock 250 connects to the Ethernet switch 260.

The systems and methods utilize a standard module interface (Ethernet MI in CohOBO or CFP2-DCO), existing backplane interfaces (1000 BT) or standard shelf external interface (ILAN), and overlays PTP/1588 sync messages for the purpose of distributing a common time base for distributed deskewing and aligned consequent actions.

IEEE 1588 PTP functionality is well defined for the purpose of communicating a time base over a standard Ethernet or Optical Transport Network (OTN) interfaces. IEEE 1588 PTP functionality uses timestamps, symmetrical RX/TX delays, and specific sync messages to communicate frequency and phase (time) across an interface. The IEEE 1588 clock 250 can perform this functionality with one another to ensure every optical device 202, 204 shares the same time base 242.

For the purpose of the systems and methods, 300 ns of accuracy is needed to align the OTUC (FlexO) slices or shims (FlexE), and this is specified in FlexE and FlexO standards. The implementation can include a servo/PTP function built into the modem module boundary. Other implementations can include the servo/PTP function on a host card and assist the modem module with discrete signals.

Once a common time base is established between modules, in the FlexO/FlexE sink functions 26, 28, it can be used to measure relative skew of the OTSi members. For FlexE, this time base would be used to measure the arrival of the shim multiframe. For FlexO, this time base would be used to measure the arrival of the OTUC Multiframe Alignment Signal (MFAS). Once all member skews are measured, the optical devices 202, 204 can figure out the latest (most delayed) member and set a delay element (buffer) such as the delay circuitry 230 in the data path to all other members to match the worst-case. This essentially deskews all members to a common phase. In the source function, the common time base can be used to align (within 300 ns) the OTUC/ODUC frame boundaries and provide a unified ODUCn AIS.

Figure 7:
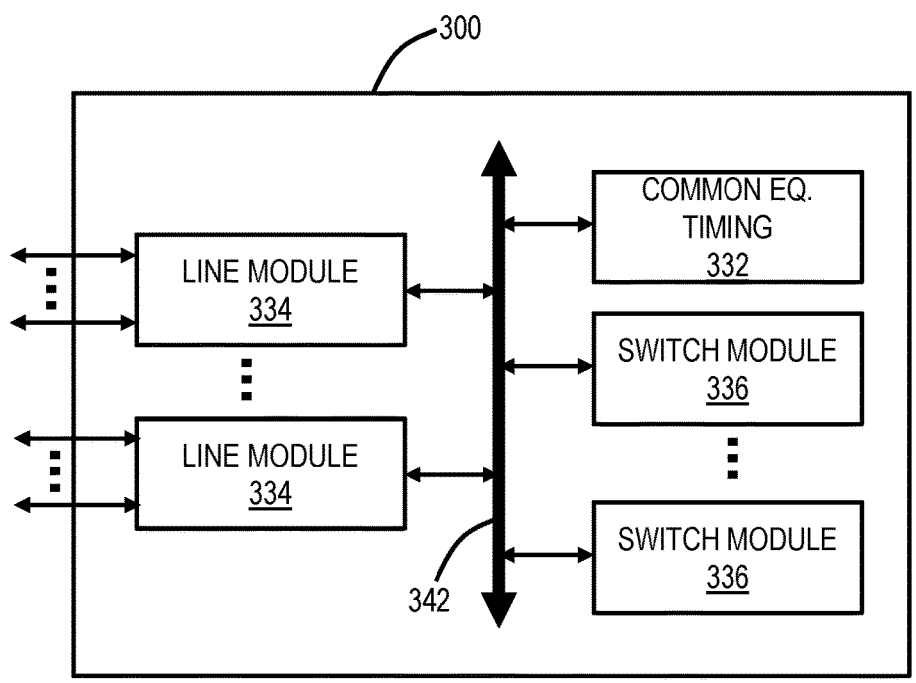
FIG. 7 is a block diagram of an example network element for use with the systems and methods described herein.

FIG. 7 is a block diagram of an example network element 300 for use with the systems and methods described herein. For example, the network element 300 may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 300 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the network element 300 can be any digital system and with ingress and egress digital signals and switching of channels, timeslots, tributary units, etc. Also, the network element 300 can be an optical system with ingress and egress of wavelengths and switching of wavelengths. Further, the network element 300 can be a combination of a digital and optical system. While the network element 300 is generally shown as an optical network element, the systems and methods contemplated for use with any system which hosts the optical devices 202, 204 and which performs system level timing synchronization and deskewing.

In an embodiment, the network element 300 includes common equipment 332, one or more line modules 334, and one or more switch modules 336. The common equipment 332 can include power; a control module; Operations, Administration, Maintenance, and Provisioning (OAM&P) access; user interface ports; and the like. The network element 300 can include an interface 342 for communicatively coupling the common equipment 332, the line modules 334, and the switch modules 336 to one another. For example, the interface 342 can be a backplane, midplane, a bus, optical or electrical connectors, or the like. In the case where the common equipment 332 and the modules 334, 336 are separate devices, e.g., pizza boxes, the interface 342 can be cabling or the like.

The line modules 334 are configured to provide ingress and egress to the switch modules 336 and to external connections on the links to/from the network element 300. In an embodiment, the line modules 334 can form ingress and egress switches with the switch modules 336 as center stage switches for a three-stage switch, e.g., a three-stage Clos switch. Other configurations and/or architectures are also contemplated. The line modules 334 can include optical transceivers, such as, for example, 100 G+ Flexible Ethernet (FlexE), Flexible OTN (FlexO), etc. Further, the line modules 334 can include a plurality of optical connections per module and each module may include flexible rate support for any type of connection, such as, for example, 100 Gb/s, 400 Gb/s. N×1.25 Gb/s, N×100 Gb/s, and any rate in between as well as future higher rates. The line modules 334 can include wavelength division multiplexing interfaces, short reach interfaces, and the like, and can connect to other line modules 334 on remote network elements, end clients, edge routers, and the like, e.g., forming connections on the links in a network. From a logical perspective, the line modules 334 provide ingress and egress ports to the network element 300, and each line module 334 can include one or more physical ports. The switch modules 336 are configured to switch channels, timeslots, tributary units, packets, etc. between the line modules 334. For example, the switch modules 336 can provide OTN granularity; SONET/SDH granularity; Ethernet granularity; and the like. Specifically, the switch modules 336 can include Time Division Multiplexed (TDM) (i.e., circuit switching) and/or packet switching engines. The switch modules 336 can include redundancy as well, such as 1:1, 1:N, etc.

Those of ordinary skill in the art will recognize the network element 300 can include other components which are omitted for illustration purposes, and that the systems and methods described herein are contemplated for use with a plurality of different network elements with the network element 300 presented as an example type of network element. For example, in another embodiment, the network element 300 may not include the switch modules 336, but rather have the corresponding functionality in the line modules 334 (or some equivalent) in a distributed fashion. For the network element 300, other architectures providing ingress, egress, and switching are also contemplated for the systems and methods described herein. In general, the systems and methods described herein contemplate use with any network element providing switching and/or transport of channels, timeslots, tributary units, wavelengths, etc.

In an embodiment, the line modules 334 can support OTSi members and common time synchronization for deskewing.

Figure 8:
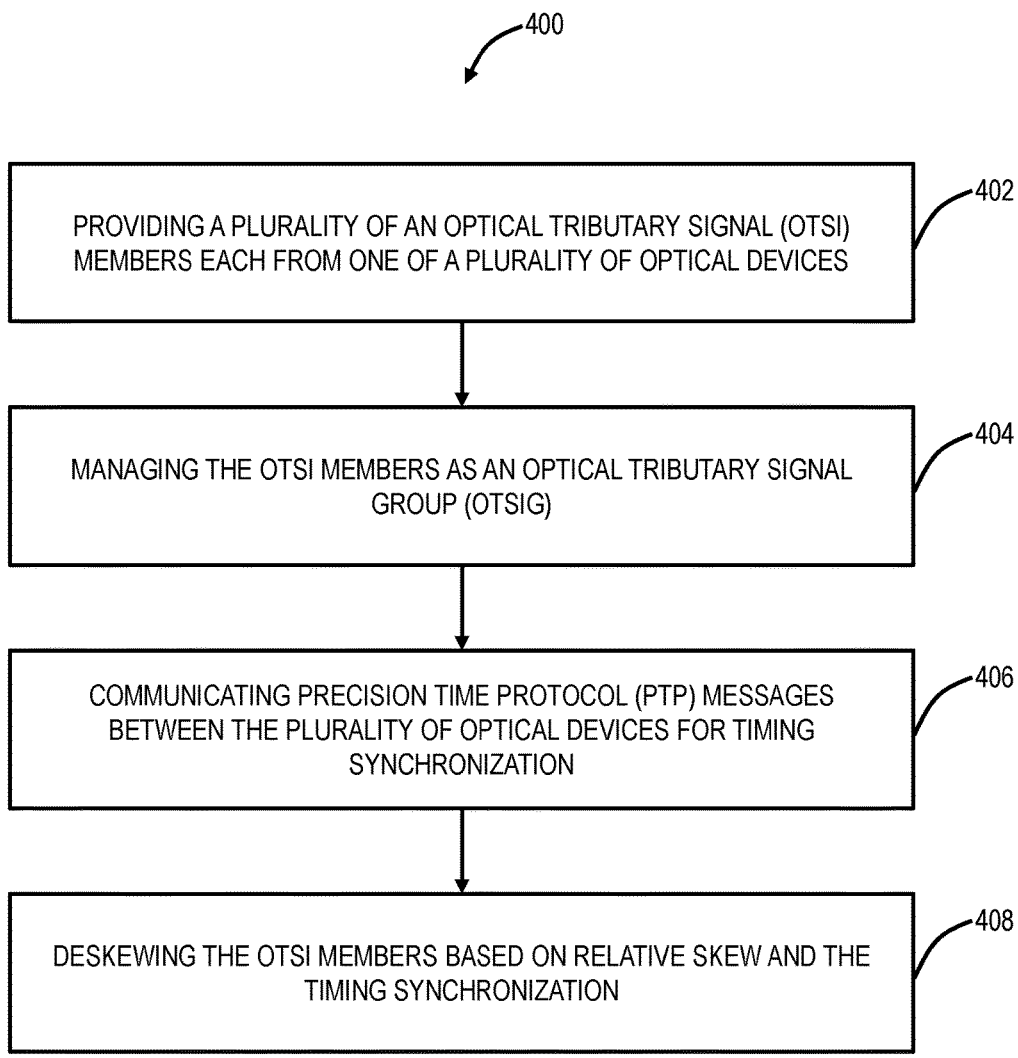
FIG. 8 is a process for timing synchronization, deskewing, and aligning across optical modules.

FIG. 8 is a process 400 for timing synchronization and deskewing across optical modules. The process 400 includes providing a plurality of an Optical Tributary Signal (OTSi) members each from one of a plurality of optical devices (step 402); managing the OTSi members as an Optical Tributary Signal Group (OTSiG) (step 404); communicating Precision Time Protocol (PTP) messages between the plurality of optical devices for timing synchronization (step 406); and deskewing the OTSi members based on relative skew and the timing synchronization (step 408).

In an embodiment, an optical system 100, 110, 112, 120, 122 supporting timing synchronization and deskewing across optical modules includes a plurality of optical devices 102, 140, 142, 170, 172 each providing an Optical Tributary Signal (OTSi) which are part of an Optical Tributary Signal Group (OTSiG) 104, 114, 124; and a communication mechanism 132, 160, 190 between the plurality of optical devices, wherein each of the plurality of optical devices are timing synchronized using the communication mechanism 132, 160, 190 and Precision Time Protocol (PTP) messaging.

Each of the plurality of optical devices 102, 140, 142, 170, 172 can include delay circuitry 230 configured to deskew an associated OTSi with other OTSi signals in the OTSiG 104, 114, 124. Each of the plurality of optical devices 102, 140, 142, 170, 172 can include a time base 242 which is synchronized between each of the plurality of optical devices 102, 140, 142, 170, 172. The optical system of claim 3, wherein each of the plurality of optical devices 102, 140, 142, 170, 172 can be configured to measure relative skew of its OTSi using the time base 242. The relative skew can be measured for a Flexible Ethernet (FlexE) signal based on a shim multiframe and for a Flexible Optical (FlexO) signal based on an Optical Transport Unit C (OTUC) Multiframe Alignment Signal (MFAS).

The communication mechanism 132, 160, 190 includes Ethernet. The communication mechanism 132, 160, 190 is one of a standards-based interface based on a Multi Source Agreement (MSA), a backplane interface, and an external interface connected via cables. The plurality of optical devices 102, 140, 142, 170, 172 can include pluggable optical modules compliant to a Multi Source Agreement (MSA). The plurality of optical devices 102, 140, 142, 170, 172 can include standardized on-board optics. The plurality of optical devices 102, 140, 142, 170, 172 can include independent hardware modules.

The plurality of optical devices 102, 140, 142, 170, 172 can include a host board 206, 208 and an optical modem 216, 218. The host board 206, 208 can include an Ethernet switch 260 which is part of the management communication mechanism and connected to other Ethernet switches on other host boards. The host board 206, 208 can include an IEEE 1588 clock 250 which is configured to perform the Precision Time Protocol (PTP) messaging for synchronization. The optical modem 216, 218 can include an IEEE 1588 clock 250 which is configured to perform the Precision Time Protocol (PTP) messaging for synchronization. The optical modem 216, 218 can include delay measurement and control circuitry 240 which is configured to measure delay and to deskew signals.

In another embodiment, an optical modem 216, 218 supporting an Optical Tributary Signal (OTSi) which is part of an Optical Tributary Signal Group (OTSiG) includes a coherent modem 220; circuitry 222, 224, 226, 228, 230 configured to perform a plurality of Forward Error Correction (FEC), framing, and mapping; a time base 242 which is synchronized with other optical modems in the OTSiG using a communication mechanism and Precision Time Protocol (PTP) messaging; and delay measurement and control circuitry 240 configured to measure delay, determine a relative skew, and deskew based on the time base. The optical modem 216, 218 can be a pluggable optical module compliant to a Multi Source Agreement (MSA) or Optical Internetworking Forum (OIF) Digital Coherent Optics (DCO). The optical modem 216, 218 can be a standardized on-board optics module. The optical modem 216, 218 can be disposed in an independent hardware module.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical system supporting timing synchronization and alignment or deskewing across optical modules, the optical system comprising:
   a plurality of optical devices each providing an Optical Tributary Signal (OTSi) which is part of an Optical Tributary Signal Group (OTSiG); and
   a management communication mechanism between the plurality of optical devices, wherein the management communication mechanism is Ethernet over one of a standards-based interface based on a Multi Source Agreement (MSA) or Optical Internetworking Forum (OIF) Digital Coherent Optics (DCO), a backplane interface, and an external interface connected via cables,
   wherein each of the plurality of optical devices are timing synchronized using the management communication mechanism and Precision Time Protocol (PTP) messaging.

2. The optical system of claim 1, wherein each of the plurality of optical devices comprises delay circuitry configured to deskew an associated OTSi with respect to other OTSi signals in the OTSiG.

3. The optical system of claim 1, wherein each of the plurality of optical devices comprises a time base which is synchronized between each of the plurality of optical devices.

4. The optical system of claim 3, wherein each of the plurality of optical devices is configured to measure relative skew of its OTSi using the time base.

5. The optical system of claim 4, wherein the relative skew is measured for one of a Flexible Ethernet (FlexE) signal based on a shim multiframe and a Flexible Optical (FlexO) signal based on an Optical Transport Unit C (OTUC) Multiframe Alignment Signal (MFAS).

6. The optical system of claim 1, wherein the plurality of optical devices comprise pluggable optical modules compliant to one of a Multi Source Agreement (MSA) and Optical Internetworking Forum (OIF) Digital Coherent Optics (DCO).

7. The optical system of claim 1, wherein the plurality of optical devices comprise standardized on-board optics.

8. The optical system of claim 1, wherein the plurality of optical devices comprise independent hardware modules.

9. The optical system of claim 1, wherein each of the plurality of optical devices comprise a host board and an optical modem.

10. The optical system of claim 9, wherein the host board comprises an Ethernet switch which is part of the management communication mechanism and connected to other Ethernet switches on other host boards.

11. The optical system of claim 9, wherein the host board comprises an IEEE 1588 clock which is configured to perform the Precision Time Protocol (PTP) messaging for synchronization.

12. The optical system of claim 9, wherein the optical modem comprises an IEEE 1588 clock which is configured to perform the Precision Time Protocol (PTP) messaging for synchronization.

13. The optical system of claim 9, wherein the optical modem comprises delay measurement and control circuitry which is configured to measure delay and to deskew signals.

14. An optical modem supporting an Optical Tributary Signal (OTSi) which is part of an Optical Tributary Signal Group (OTSiG), the optical modem comprising:
a coherent modem;
circuitry configured to perform a plurality of Forward Error Correction (FEC), framing, and mapping;
a time base which is synchronized with other optical modems in the OTSiG using a management communication mechanism and Precision Time Protocol (PTP) messaging; and
delay measurement and control circuitry configured to measure delay, determine a relative skew, and deskew based on a common time base,
wherein the optical modem is a pluggable optical module compliant to one of a Multi Source Agreement (MSA) and Optical Internetworking Forum (OIF) Digital Coherent Optics (DCO).

15. The optical modem of claim 14, wherein the relative skew is measured for one of a Flexible Ethernet (FlexE) signal based on a shim multiframe and a Flexible Optical (FlexO) signal based on an Optical Transport Unit C (OTUC) Multiframe Alignment Signal (MFAS).

16. An optical system supporting timing synchronization and alignment or deskewing across optical modules, the optical system comprising:
a plurality of optical devices each providing an Optical Tributary Signal (OTSi) which is part of an Optical Tributary Signal Group (OTSiG); and
a management communication mechanism between the plurality of optical devices,
wherein each of the plurality of optical devices are timing synchronized using the management communication mechanism and Precision Time Protocol (PTP) messaging,
wherein the plurality of optical devices comprise pluggable optical modules compliant to one of a Multi Source Agreement (MSA) and Optical Internetworking Forum (OIF) Digital Coherent Optics (DCO).

17. The optical system of claim 16, wherein each of the plurality of optical devices comprises delay circuitry configured to deskew an associated OTSi with respect to other OTSi signals in the OTSiG.

18. An optical system supporting timing synchronization and alignment or deskewing across optical modules, the optical system comprising:
a plurality of optical devices each providing an Optical Tributary Signal (OTSi) which is part of an Optical Tributary Signal Group (OTSiG), wherein each of the plurality of optical device comprises a time base which is synchronized between each of the plurality of optical devices, wherein each of the plurality of optical devices is configured to measure relative skew of its OTSi using the time base, and wherein the relative skew is measured for one of a Flexible Ethernet (FlexE) signal based on a shim multiframe and a Flexible Optical (FlexO) signal based on an Optical Transport Unit C (OTUC) Multiframe Alignment Signal (MFAS); and
a management communication mechanism between the plurality of optical devices,
wherein each of the plurality of optical devices are timing synchronized using the management communication mechanism and Precision Time Protocol (PTP) messaging.

19. The optical system of claim 18, wherein each of the plurality of optical devices comprises delay circuitry configured to deskew an associated OTSi with respect to other OTSi signals in the OTSiG.

20. The optical system of claim 18, wherein the plurality of optical devices comprise any of i) pluggable optical modules compliant to one of a Multi Source Agreement (MSA) and Optical Internetworking Forum (OIF) Digital Coherent Optics (DCO), ii) standardized on-board optics, iii) independent hardware modules, and iv) a host board and an optical modem.

* * * * *